No. 750,871. Patented February 2, 1904.

UNITED STATES PATENT OFFICE.

ADOLF J. MARSCHALL, OF LITTLEFALLS, NEW YORK.

EXCITING COMPOUND FOR BATTERIES.

SPECIFICATION forming part of Letters Patent No. 750,871, dated February 2, 1904.

Application filed May 21, 1903. Serial No. 158,134. (No specimens.)

*To all whom it may concern:*

Be it known that I, ADOLF J. MARSCHALL, a citizen of the United States, residing in Littlefalls, Herkimer county, State of New York, have invented certain new and useful Improvements in Exciting Compounds for Batteries, of which the following is a specification.

My invention relates to electrical batteries, and has for its object to provide an exciting compound or mixture which will produce batteries of good keeping qualities.

My invention is applicable especially to so-called "dry" batteries, but may be used for wet cells as well. The construction of the battery proper forms no part of my present invention, it being understood that my improved compound may be used in connection with the usual construction of dry batteries and with wet cells—say of the type of the Leclanché cell—provided the air is excluded.

In carrying out my invention I employ a liquid which consists of an aqueous solution of zinc chlorid, ($ZnCl_2$,) with an addition of ammonium chlorid, ($NH_4Cl$,) the proportion of ammonium chlorid being small as compared with the proportions hitherto employed in similar mixtures. Whereas it has been customary to employ a concentrated solution of ammonium chlorid with an addition of zinc chlorid, the ammonium chlorid being greatly in excess, I now have considerably increased the proportion of zinc chlorid and prefer to employ a larger amount of zinc chlorid than of ammonium chlorid. I find that by thus changing the proportions I increase the life of the cell very materially by diminishing the destructive local action.

So far I have obtained the best results with a liquid composed as follows: water, one hundred parts, by weight; zinc chlorid, ($ZnCl_2$,) eighty parts; ammonium chlorid, ($NH_4Cl$,) six parts. The water and the zinc chlorid form a solution of the specific gravity of 1.47. Experiments have shown that satisfactory results are obtained with even thirty to forty parts of zinc chlorid to one hundred parts of water and from one to ten parts of ammonium chlorid. However, it seems that the solutions containing a higher proportion of zinc chlorid give the cells better keeping qualities.

Although I prefer to use the chlorids of zinc and ammonium for my compound, I do not wish to limit myself to these salts, as several other soluble salts of zinc and ammonium—for instance, the sulfates—may be employed, either singly or mixed, with more or less satisfactory results. Such equivalents are understood to be covered by the appended claims.

I claim as my invention and desire to secure by Letters Patent—

1. An exciting compound for electrical batteries, consisting of a solution of zinc chlorid and ammonium chlorid, the zinc chlorid being in excess of the ammonium chlorid.

2. An exciting compound for electrical batteries, consisting of a solution of zinc chlorid and ammonium chlorid, the zinc chlorid being greatly in excess of the ammonium chlorid.

3. An exciting compound for electrical batteries, consisting of a strong solution of zinc chlorid with a small addition of ammonium chlorid.

4. An exciting compound for electrical batteries, consisting of a solution of about eighty parts of zinc chlorid and about six parts of ammonium chlorid in one hundred parts of water.

In testimony whereof I have signed my name to this specification in the presence of two subscribing witnesses.

ADOLF J. MARSCHALL.

Witnesses:
J. M. STEARNS,
F. G. BIEMANN.